United States Patent [19]

Lantier

[11] 3,770,880

[45] Nov. 6, 1973

[54] LOGICAL CALL FEE DETERMINATION DEVICE FOR USE WITH TELEGRAPHIC EQUIPMENT

[75] Inventor: Maurice Lantier, Paris, France

[73] Assignee: Compagnie Industrielle des Telecommunications, Paris, France

[22] Filed: May 15, 1972

[21] Appl. No.: 253,013

[30] Foreign Application Priority Data

May 14, 1971 France .............................. 7117648

[52] U.S. Cl. .............................................. 178/2 F
[51] Int. Cl. .......................................... H04l 15/26
[58] Field of Search ...................................... 178/2 F

[56] References Cited

UNITED STATES PATENTS 3,621,120 11/1971 Demartres .......................... 178/2 F

*Primary Examiner*—Kathleen H. Claffy
*Assistant Examiner*—Kenneth D. Baugh
*Attorney*—Richard C. Sughrue et al.

[57] ABSTRACT

A logic device for telegraphic call charge enabling or not enabling. The starting of the charging is dependent on the receipt of two successive signals; the first signal being a pulse having a determined length, the second signal being a character of the international code No. 2. The logic device comprises two series of gates establishing time references, the first series of said gates checking the reception of the first signal and the second series checking that of the second signal, the reception of the said second signal depending on that of the first.

13 Claims, 5 Drawing Figures

LOGICAL CALL FEE DETERMINATION DEVICE FOR USE WITH TELEGRAPHIC EQUIPMENT

The present invention has for its object a logic call fee determination or charging device which can be used in telecommunications and more particularly in the charging of telegraphic communications.

The device according to the invention, produced by means of integrated circuits, replaces, to great advantage, the "system for automatically charging telegraphic communications" described in U.S. Pat. No. 3,621,120 of Nov. 16, 1971. Like the latter, the present invention does not allow the start up of the charging system in the calling subscriber's exchange until the reception of two data items; the first being a signal characterizing the establishing of the communication, the second being a combination of international code No. 2.

Nevertheless, whereas the first data item remains unchanged (150 millisecond negative pulse possibly enabling the connection between two correspondents to be established) the charging characteristic of the communication is not the receiving of the "letters shift" as the first character of the called subscriber's answer-back code, but the receiving of any character except "carriage-return", the receiving of the "carriage return" character after the connection pulse characterizing a non-chargeable communication.

The device according to the present invention is characterized in that it has its own independent operation contrary to the previous device which had to be coupled to a receiver in order to receive the time periods required for detecting the 150 millisecond pulse and the first character of the answer-back code. Moreover, the producing of the device by means of integrated circuit elements in series entails a lesser bulk and appreciable cost saving.

The device according to the invention is characterized in that it comprises peripheral means for adapting its internal elements, which can be made of integrated circuits, to its external elements, means supplying the time references required for the discriminating of the signals received, means for checking, during receiving, the length of the first signal and for subsequently confirming the correct receiving of the said signal, means for blocking the device between the end of the receiving of the first signal and the beginning of the receiving of the second, means for discriminating between the receiving of a given character of the international code No. 2 and the receiving of another character of the said code, means enabling a charging order or non-charging order to be supplied according to the signals received, erasing means and means for cancelling when the signals received are defective.

According to one characteristic of the invention, the device has three inputs and three outputs, the said inputs and outputs being connected to transistorized circuits providing the interface between the elements of a line state translator unit and the integrated circuits of the device, the latter having at least one of its inputs connected directly to an output of the translator unit.

According to another characteristic of the invention, the device comprises two interconnected monostable flip-flops forming a clock and two gates in series enabling the controlling of the clock.

According to another characteristic of the invention, the signals of the clock are applied to a counter whose true outputs and complemented outputs are connected, in a determined order, to the inputs of several gates, the said gates establishing as a function of their opening or of their not opening, time references necessary for the detecting operations.

According to another characteristic of the invention, the starting of the clock and the advancing of the counter are effected when the line passes from a positive state to the negative state, the negative state being indicated to the device, a previous marking have been effected at one input of the device.

According to another characteristic of the invention, the device confirms the detecting of a first signal consisting of a negative pulse whose duration is between two limits determined from the instant of origin of the pulse.

According to another characteristic of the invention, the device comprises two series of gates establishing time references, the first series of the said gates controlling the receiving of the first signal and the second series controlling that of the second signal, the receiving of the said second signal depending on that of the first.

According to another characteristic of the invention, the first two gates of the first series of time references enable the checking of the duration of the pulse constituting the first signal received, a third time reference gate locking the device if the pulse is correct, the said device then being in the waiting position for the receiving of the second signal and supplying an order indicating the receiving of a correct pulse.

According to another characteristic of the invention, the time references established by the second series of gates makes it possible in combination with a monostable flip-flop, to sample the state of the line at given instants, each of the said instants being situated respectively in the interval of time of each moment of the character received.

According to a further characteristic of the invention, in the second series of time reference gates, a first gate establishes a first time reference included in the duration of the first moment, the said gate making it possible to check the state of the first three moments received, a second gate establishing a second time reference included in the duration of the fourth moment, the said time reference making it possible to check the state of the last two moments of the character.

According to a further characteristic of the invention, a third time reference gate of the second series locks the device at the end of the receiving of the character, the said device supplying, at the output, a non chargeability or chargeability order according to whether it receives a determined character of the international code No. 2 or any other character of the said code.

Other characteristics of the invention could become apparent from the description and the detailed operation of an embodiment of the invention with reference to the accompanying figures, given by way of illustration, among which:

Figure 1:
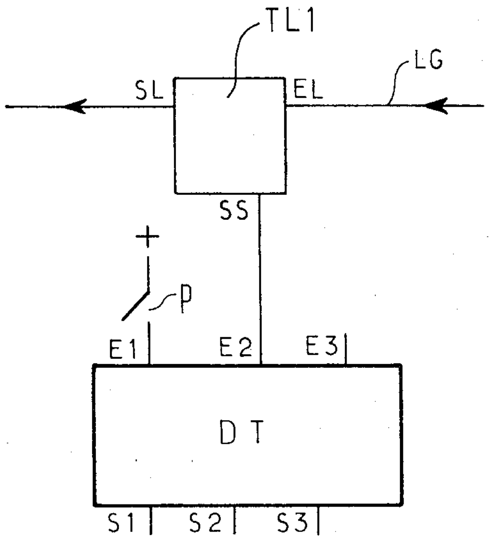
FIGS. 1 and 2 show respectively, the connecting up of the inputs of the device according to the invention as a function of the type of line translator unit used.
Figure 2:
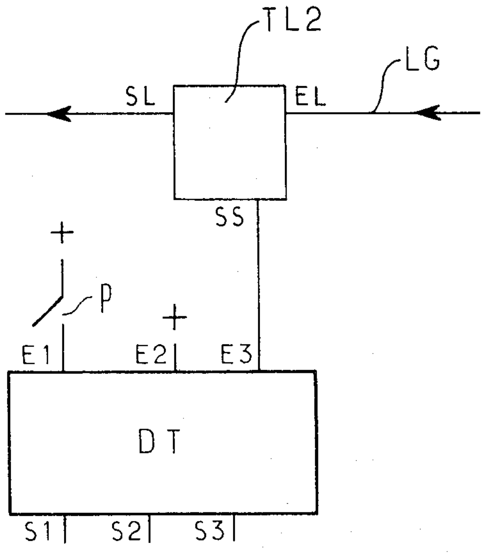

In the two assemblies shown in FIGS. 1 and 2, the telegraphic line LG crosses a line translator unit TL1 or TL2 whose line input EL is connected to the called subscriber side and whose line output SL is directed towards the calling subscriber side, the telegraphic signals passing through the line in the direction EL–SL. The charging discriminator DT constitutes the device according to the invention. It comprises three inputs, E1, E2 and E3 and three outputs S1, S2 and S3, its input E2 or E3 being connected up to the translator TL1 or TL2 according to the type of translator used.

When the line is in the positive state (potential + 48V), the translator TL1 does not supply any marking at the output SS. The negative state of the line is detected by TL1 which supplies a positive polarity at the output SS. That polarity is received at the input E2 of the charging discriminator. The latter can operate only if a previous positive order is applied and maintained at its input E1 during all the time when it can be attracted by the line translator, that order being formed, for example, by the closing of a contact *p* of a relay of an element (a recording unit, for example) which has been informed of the connection of the exchange with the called subscriber.

The input E3 is not used.

The line translator TL2 has an analogous operation to that of the line translator TL1, but it detects the positive states of the line, contrary to TL1, which detects the negative states. For that reason, the connecting up of the translator TL2 with the discriminator DT is modified, the input E3 of the latter being connected up to the output SS of the translator and the input E2 being connected up to a positive polarity. Due to the modifications of the connections effected, at the inputs of the discriminator, the latter interprets in an identical way the states of the line which are communicated to it by one type of translator or the other.

In the following description, for convenience sake, the order of the inputs of the gates is designated from left to right or from bottom to top, according to the direction of the said gates.

Figure 3:
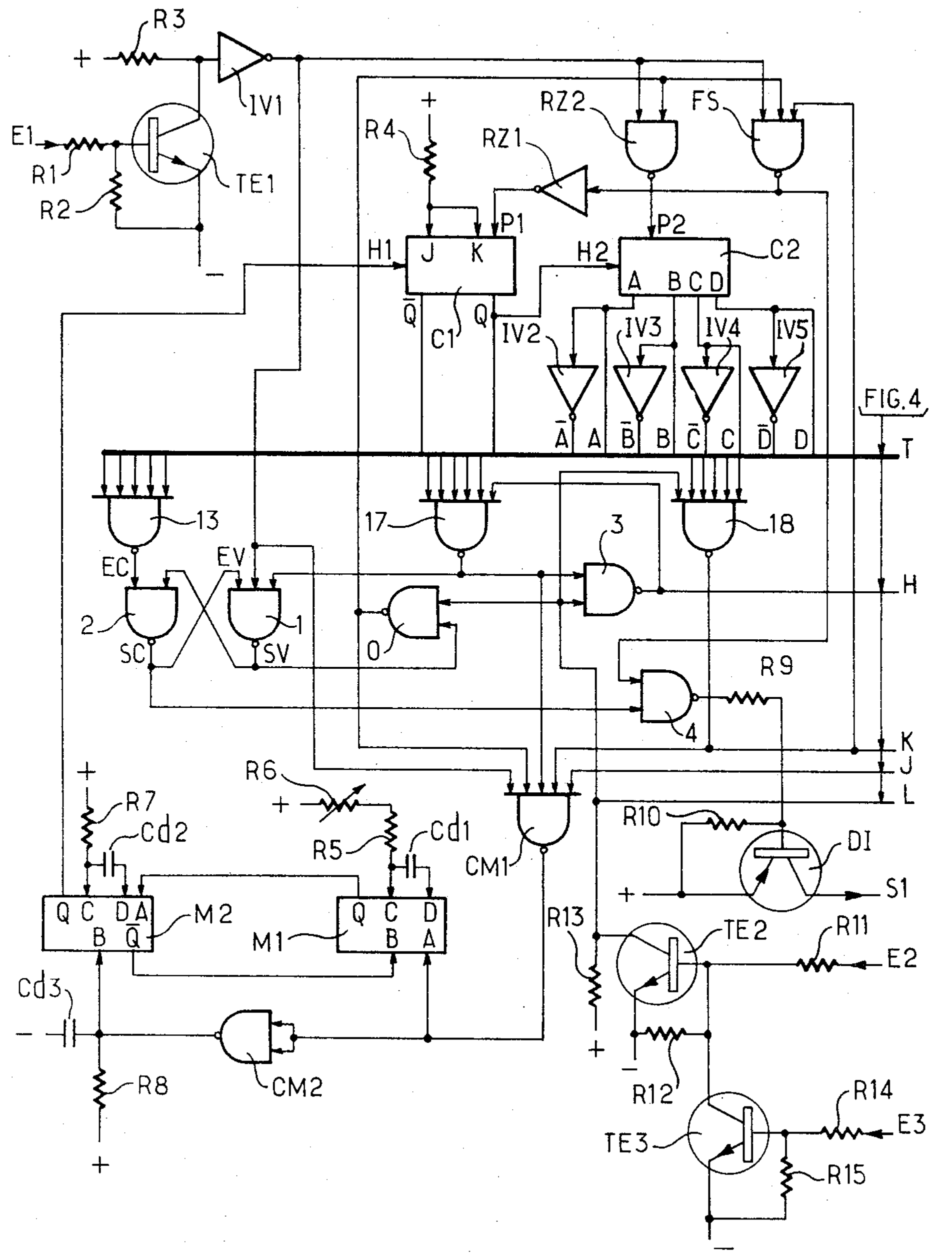
FIG. 3 shows diagrammatically the first part of the device according to the invention enabling the detecting of the connection pulse.
Figure 4:
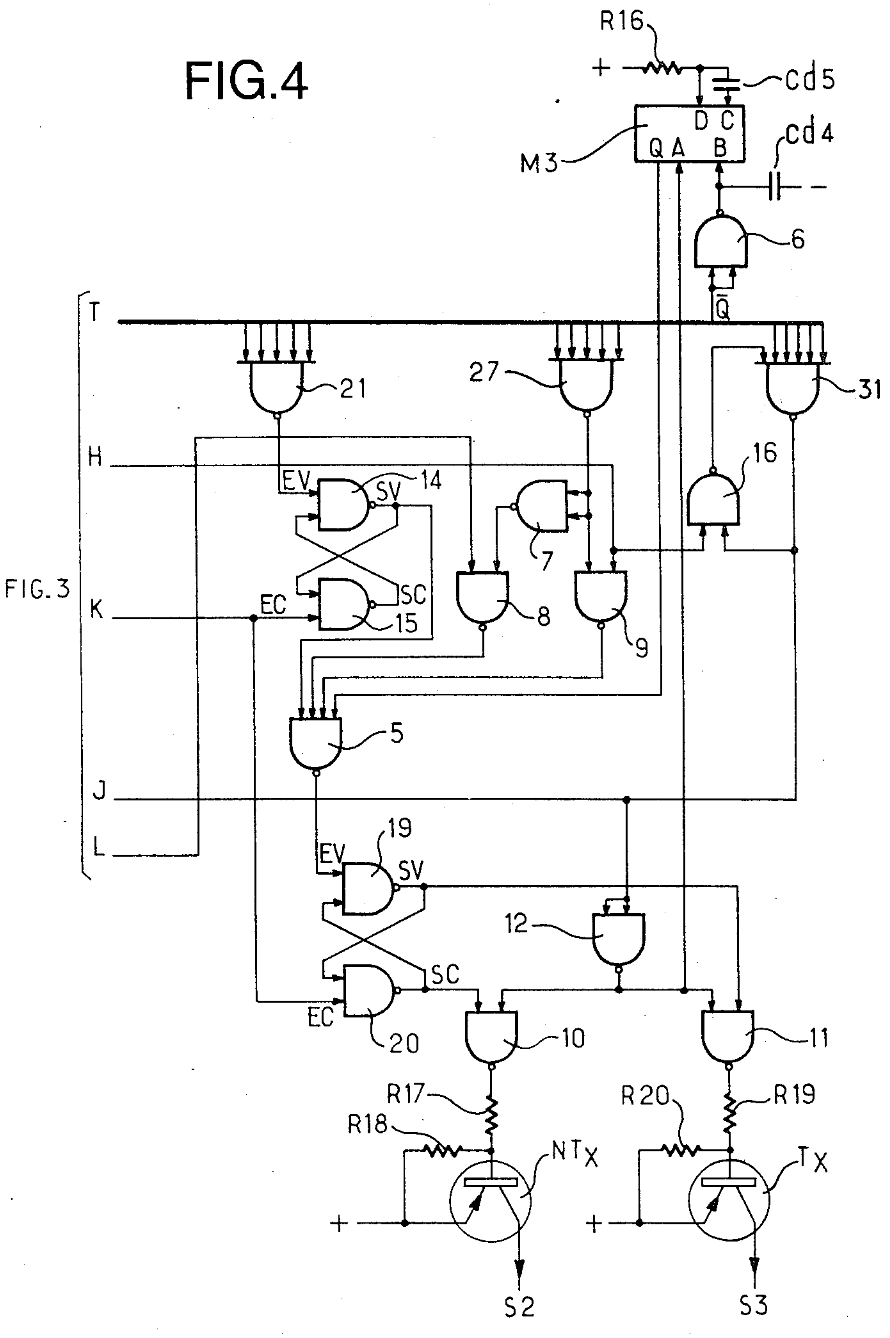
FIG. 4 shows diagrammatically the second part of the device according to the invention making it possible, in connection with the first, to effect the discriminating of the first character of the answer-back signal of the called subscriber.

In the first part of the device shown in FIG. 3, the input E1 of the charging discriminator is connected up to the base of a transistor TE1 of NPN type across a resistor R1, the said base also being connected to the emitter across a resistor R2, the emitter being at the negative polarity of the current supply. The collector of the transistor TE1 is connected, on the one hand, to a resistor R3 connected to the positive polarity and, on the other hand, to an inverter IV1. The output of that inverter is connected up to a first input of the gates RZ2 and FS, to the true input EV of a bistable flip-flop consisting of two interconnected gates 1 and 2 and to a first input of a gate CM1 having five inputs. The output of the gate CM1 is connected to the input A of a monostable flip-flop M1 and to the two inputs of a gate CM2 used as an inverter, the output of the latter being connected as a common point to the input B of a monostable flip-flop M2, to a resistor R8 whose end is connected to a positive polarity, to a capacitor Cd3 whose other plate is connected to a negative polarity. The output Q of the monostable flip-flop M1 is connected to the input A of the monostable flip-flop M2 and conversely, the output $\overline{Q}$ of the flip-flop M2 is connected to the input B of the flip-flop M1. Two other inputs C and D of the flip-flop M1 are connected respectively to the terminals of a capacitor Cd1, the input C also being connected to a circuit formed, by the resistors R5 and R6 in series, the end of the variable resistor R6 being connected up to the positive polarity. A capacitor Cd2 is also connected by its terminals to the inputs C and D of the monostable flip-flop M2, the input C also being connected to a resistor R7 whose end is connected to the positive polarity. The assembly formed by the flip-flops M1 and M2 and their elements compose a clock whose output Q is connected to the input H1 of a JK flip-flop C1 of the master-slave type. The linked inputs J, K of the latter are connected to a resistor R4 connected to the positive polarity, the said flip-flop C1 forming a counter dividing by 2 for the clock frequency, and whose output Q is connected to the input H2 of a second counter C2. The latter, formed by four series connected binary flip-flops, is a divider by 16, the counters C1 and C2 forming a single counter having 32 steps. The true outputs A, B, C, D of C2 are connected respectively to the inverters IV2 to IV5 in order to obtain their complement $\overline{A}$ to $\overline{D}$. The assembly formed by the true and complemented outputs of C2, as well as the outputs Q and $\overline{Q}$ of C1 form a strand T from which five inputs of the gates 13, 17 and 18 lead out. The output of the gate 13 connects up the first input of the gate 2 forming the complemented input (EC) of the bistable flip-flop consisting of the gates 1 and 2. The output of the gate 1 (true output SV of the flip-flop) is connected as a common point to the second input of the gate 2 and to the first input of the gate 0. The output of the gate 2 (complemented output SC of the flip-flop) is connected to the first input of the gate 4. The output of the gate 0 is connected to a second input of the gates RZ2 and FS and to the second input of the gate CM1. The output of the gate 17 is connected as a common point to the third input of the gate 1, to the second input of the gate 3 and to the third input of the gate CM1. The output of the gate 18 is connected as a common point to the fourth input on the gate CM1, to a third input of the gate FS and to a connection K in FIG. 4. A connection J coming from FIG. 4 is connected to the fifth input of the gate CM1. The output of the gate FS is connected on the one hand to an input P1 of the counter C1 through an inverter RZ1 and, on the other hand, to a second input of the gate 4. The output of the gate RZ2 is connected up to the input P2 of the counter C2. The output of the gate 4 is connected to the base of a transistor D1 of PNP type across a resistor R9. The emitter of the transistor DI is connected to the positive polarity and its collector is connected to the output S1 of the device, a resistor R10 connecting the base and the emitter of the said transistor. The input E2 of the device is connected as a common point, across a resistor R11, to the base of a transistor TE2 of the NPN type and to the collector of a transistor TE3 of the NPN type. A resistor R12 connects the emitter-base junction of the transistor TE2 whose emitter is connected to the negative polarity. The collector of the transistor TE2 is connected as a common point to a resistor R13 connected to the positive polarity, to a connection L in FIG. 4, to the first input of the gate 3 (itself connected up to the second input of the gate 0) and lastly to the first input of the gate 18. The output of the gate 3 is connected to a sixth input of the gate 17 and to a connection H in FIG. 4.

The input E3 of the device is connected across a resistor R14, to the base of the transistor TE3 whose emitter is connected up to the negative polarity, a resistor R15 connecting up the emitter-base junction of that transistor.

In the second part of the device shown in FIG. 4, five inputs of the gates 21, 27 and 31 lead out from strand T composed by the wires of the true and complemented outputs of the counter C1–C2 in FIG. 3. The output of the gate 21 is connected to the true input EV of a bistable flip-flop composed of the interconnected gates 14 and 15, the true output SV of that flip-flop being connected to the first input of a gate 5 having four inputs. The output of the gate 27 is connected to the two inputs of a gate 7 and to a first input of a gate 9. The output of the gate 7 is connected to a second input of a gate 8 whose first input is connected to the connection L in FIG. 3. The output of the gate 8 is connected to the second input of the gate 5 and the output of the gate 9 is connected to the third input of the gate 5. The connection H coming from FIG. 3 is connected as a common point to the second input of the gate 9 and to the first input of the gate 16. The output of the gate 16 is connected to the first input of the gate 31, whose output is connected to the second input of the gate 16, to the two inputs of the gate 12 and to the connection J. The output of the gate 5 is connected to the true input EV of a bistable flip-flop composed of the gates 19 and 20. The complemented inputs EC of the flip-flops 14, 15 and 19, 20 are connected as a common point to the connection K. The complemented output SC of the flip-flop 19, 20 is connected to a first input of the gate 10 and the true output SV of that flip-flop is connected to a second input of the gate 11. The output of the gate 12 is connected as a common point to the second input of the gate 10, to the first input of the gate 11 and the input A of a monostable flip-flop M3 whose output Q is connected to the fourth input of the gate 5. The gate 6 is used as an inverter, its two inputs being connected up as a common point and connected, by a wire of the strand T, to the output $\overline{Q}$ of the counter C1 in FIG. 3. The output of the gate 6 is connected to the input B of M3 and to a terminal of a capacitor Cd4 whose opposite terminal is connected to the negative polarity. The input C of M3 is connected to a circuit comprising a capacitor Cd5 in series with a resistor R16 whose end is connected to the positive polarity. The output of the gate 10 is connected to the base of a transistor NTX of PNP type across a resistor R17, a resistor R18 connecting the emitter-base junction of that transistor, whose emitter is connected up to the positive polarity and whose collector is connected to the output S2 of the device. The output of the gate 11 is connected to the base of a transistor TX of PNP type across a resistor R19, a resistor R20 connecting the emitter-base junction of that transistor, whose emitter is connected up to the positive polarity and whose collector is connected to the output S3 of the device.

FIG. 3 comprises the circuits and elements necessary for checking and detecting the 150 millisecond pulse. That negative pulse can be comprised, taking into account, on the one hand, the permissible tolerances (± 11 milliseconds on the duration of the signal), and on the other hand, the distortion between 131 milliseconds minimum and 169 milliseconds maximum. It must not, indeed, be mistaken for the thirty second combination of the international code No. 2 (start followed by five negative moments) whose negative pulse can reach 128 milliseconds taking distortion into account. It must, therefore, be possible to distinguish between a negative 128 ms pulse and a negative 131 ms pulse. This result is obtained by comparing the state of the line at the instant 130 ms (that instant 130 ms has been chosen for convenience sake, but could evidently be any other instant between the two limits 128 ms to 131 ms) : if the line is positive, this is the case of an interference pulse or of a thirty second combination, if the line is negative; this can be caused either by a 150 millisecond pulse, or by the releasing signal, whose duration is at least 300 milliseconds.

For that purpose, the state of the line is observed at the instant 170 milliseconds. If, at that instant, the line is positive, this is actually the case of the 150 millisecond pulse. If, on the contrary, the line is negative, this is because the releasing signal is in process. In the first case (150 ms pulse), the device waits for the instant 180 ms to confirm the detecting, and in the second case (release signal), the device returns to the rest position.

After having examined the state of the elements of the first part of the device in the rest period, the functioning of the device when the 150 millisecond pulse I is correct, that is, has a duration greater than 130 milliseconds but less than 170 milliseconds, and when the pulse is defective, that is, has a duration of less than 130 milliseconds or more than 170 milliseconds.

In the following text, it will be conventional to designate by 0 the low level of the current supply voltage which is the potential of the current source (sign −) and by 1 the high level which is the earth (sign +). Consequently, a negative potential supplied at the output of an element will mean the state 0 for that element and the absence of negative potential at the output will mean the state 1.

The supply current is applied to the integrated circuits of the device by a voltage convertor (not shown) reducing the conventional telegraphic current supply voltage of the exchange from a few tens of volt to a few volts, the adapting of the current supply between the integrated circuits and the circuits outside the device being effected by means of the input transistors (TE1, TE2, TE3) and output transistors DI, FIG. 3) (NTX and TX FIG. 4).

All the gates used in the device are NAND gates. A gate of this type is in the state 1 (or closed) when at least one of its inputs is in the state 0; it is said to be in the state 0 (or open) when all its inputs are in state 1.

1 - WAITING FOR THE 150 ms PULSE

Connecting of the device to a translator of type 1 (FIG. 1).

The line being positive, the input E2 is not supplied, and the transistor TE2 is in the state 1. Before the applying of the positive order to E1, the transistor TE1 is in the state 1 and the inverter IV1 in the state 0. The gates 1 and 2 of the bistable flip-flop are respectively in the state 1 and 0, the input EV of the flip-flop having received that state 0 and imposing the state 1 on the output SV. The gate FS is in the state 1 as is the gate RZ2. The inverter RZ1 is in the state 1. The states 0 and 1, marking respectively the inputs P1 and P2 of the counters C1 and C2, hold these latter in the rest position (step 0 of the counting assembly C1–C2 whose cycle has 32 steps).

The gates 13, 17 and 18 whose respective opening can be effected during the steps 13, 17 and 18 of the counter, are in the state 1. The gates 0 and 3 having their two inputs in the state 1 (outputs of the gates 1 and 17 and collector of TE2) are in the state 0. The gate 4 is in the state 1 and blocks the transistor DI which is in the state 1. An input of the gate CM1 being set to 0 by IV1, the gate CM1 is at 1, the gate CM2 is at 0, these states of the said gates conditioning the blocking of the clock M1–M2.

When the positive order appears at E1, the transistor TE1 passes to the state 0 and IV1 to the state 1. This has no effect on the other elements, which remain in their original state.

Connecting of the device to a translator of type 2 (FIG. 2).

The line being positive, the input G3 is supplied by a positive polarity. The transistor TE3 is in the state 0 and maintains TE2 in the state 1. The state of the other elements is the same as previously.

As the line becomes negative, if the translator is of type 1, it applies a positive polarity to the input E2 of the device, thus making the transistor TE2 change over to the state 0.

If the translator is of type 2, it cancels the positive polarity at the input E3, thus making the transistor TE3 change over to the state 1 and the transistor TE2 to the state 0.

In both cases, the transistor TE2 therefore changes over from the state 1 to the state 0, the state 1 of the said transistor indicating the positive state of the line and the state 0 of the said transistor indicating the negative state of that line.

2. PULSE COMPRISED BETWEEN, 130 ms and 170 ms.

The line having become negative, the transistor TE2, whose collector is in the state 0 sets to 0 the common input of the gates 0 and 3, whose close, assuming the state 1. The gate CM1 all of whose inputs are then in state 1 (connection J set in the state 1 by the gate 31 in FIG. 4), opens and applies the state 0 to the input A of M1.CM2 supplies the state 1 of the input B of M2. The clock M1, M2 is started up and applies 100 c/s signals to the input H1 of the counter. The gate 0 in the state 1 opens the gate FS and RZ2, which assume the state 0 and cancel respectively the locking of the counting elements C1 and C2. The counter formed by these elements progresses at a rate of one step every 10 ms. The counter having reached the step 13 at the instant 130 ms, the gate 13 opens and applies the state 0 to the input EC of the gate 2. The bistable flip-flop 1,2 reverses (output SV at 0 and SC at 1) thus confirming the instant 130 ms.

The counter continues its progress. The magnetic 150 ms pulse received in the line being comprised in the tolerance limits of the time range, the line bcomes positive again before the instant 170 ms, that is, before the beginning of the step 17. The transistor TE2 passes to the state 1 and gate 3, whose two inputs are in the state 1, opens again, thus resuming the state 0. The gate 0 remaining blocked by the bistable flip-flop 1,2 (SV in the state 0), the gate CM1 remains open and maintains the starting up of the clock.

Between the instants 170 and 180 ms, the gate 17 remains closed, although the counter is on the step 17, one of its inputs being set in the state 0 by the open gate 3. Hence, the gate CM1 remains open and enables the counter to pass the step 17.

At the beginning of the step 18, the line is normally positive and the transistor TE2 being in the state 1, the gate 18 opens and sets an input of the gate CM1, which closes, (stopping of the clock), on the one hand, and an input of the gate FS, which also closes, on the other hand, to 0. That gate, having returned to the state 1 locks the elements C1 by means of the inverter RZ1 and opens the gate 4, which unblocks the transistor DI. The latter supplies a positive polarity to the output S1, thus confirming the detecting of the 150 ms pulse. The counter remains positioned at the step 18, and the device is in the waiting position ready for the receiving of the first character of the answer-back signal of the called subscriber.

3. PULSE LESS THAN 130 ms.

The line resumes the positive position state before the counter reaches the step 13, and the transistor TE2 changes over to the state 1. The gates 0 and 3 open (state 0). The gate 0 closes the gates CM1, RZ2 and FS, which assume the state 1; stopping of the clock by CM1 and resetting to the step 0 of the counter C1–C2 by FS and RZ1, on the one hand, and RZ2 on the other hand.

4. PULSE GREATER THAN 170 ms.

The line still being negative at the instant 170 ms, beginning of the step 17 of the counter, the transistor TE2 is in the state 0 and the gate 3 remains in the state 1. The gate 17, having all its inputs in the state 1, opens (state 0) and inverts the bistable flip-flop 1,2 which resumes the original state it had assumed before the step 13 (SV in the state 1 and SC in the state 0). The gate 17 in the state 0 closes the gate CM1 which assumes the state 1 and blocks the clock. The counter remains positioned at the step 17 and waits for the line to become positive again. When the line becomes positive again, the transistor TE2 assumes the state 1 and the gates 0 and 3 change over to the state 0. The gate 3 closes the gate 17, which changes over to the state 1, whereas the gate CM1 remains held in the state 1 by the gate 0 which closes the gates FS and RZ2, these latter directly positioning the counter again at the step 0. Although the flip-flop FS is in the state 1, the gate 4 remains closed, the gate 2 being in the state 0 since the bistable flip-flop resumed its original state.

5. WAITING FOR THE FIRST LETTER OF THE ANSWER BACK SIGNAL

The counter is positioned at the step 18, the gate 18 being in the state 0. The gates 21, 27 and 31 (FIG. 4) are closed, that is, they assume the state 1. The gates 14 and 15 of a second bistable flip-flop are respectively in the state 0 and in the state 1, as are the gates 19 and 20 of a third bistable flip-flop (inputs EC of the said flip-flop set at 0 by the connection K and the gate 18). The gate 7 whose two inputs are at 1, is at 0 and holds the gate 8 in the state 1. The gates 9 and 16 are in the state 1, one of their inputs being set, by the connection H, in the state 0 of the gate 3. The gate 5 is in the state 1 (gate 14 in the state 0). The gate 6 is in the state 0. The gate 12 is in the state 0 and the gates 10 and 11 are in the state 1, blocking, respectively, the transistors NTX and TX.

6. RECEIVING OF THE FIRST CHARACTER OF THE ANSWER BACK SIGNAL

Receiving of the carriage return character (−−−+−).

Figure 5:
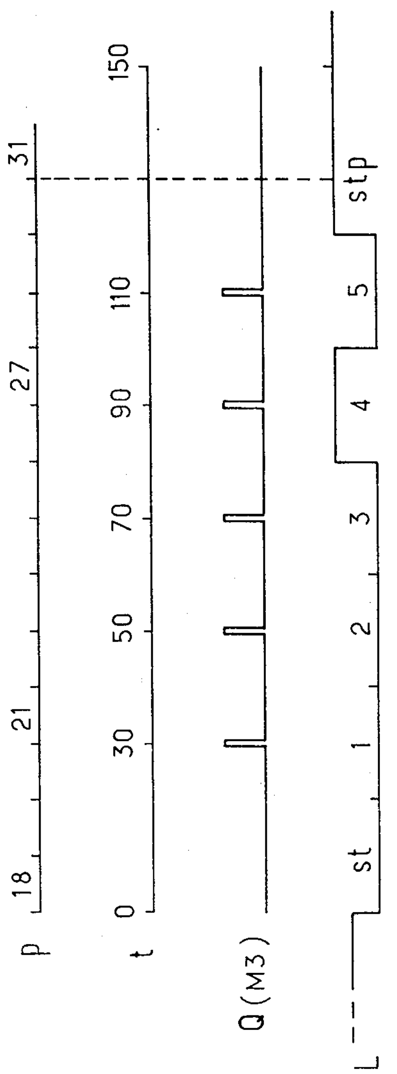
FIG. 5 is a diagram showing the states of the line as a function of the receiving of the carriage return character as well as the corresponding equivalence in time between the characteristic steps of the counter, the middle of the moments and the test points of the line.

The line becomes negative during 80 milliseconds( receiving of the 20 ms start) followed by the first three negative moments (20 ms per moment). The connection L follows the states of the line (diagram FIG. 5). At the beginning of the start, the connection L assuming the state 0, the gate 18 closes, causing the opening of the gate CM1, and another starting up of the clock. The gate 3 closes and marks the connection H with the state 0. 1, the gates 9 and 16 (FIG. 4) then assuming the state after 30 milliseconds after the beginning of the start (middle of the first moment), the counter reaches the step 21 (diagrams *t* and *p*, FIG. 5). The gate 21 opens (state 0) and reverses the second bistable flip-flop, whose gate 14 assumes the state 1 and whose gate 15 assumes the state 0 after the change in states of the said flip-flop, the gate 5 remains held in the state 1 by the open gate 9. The third bistable flip-flop does not change states. In parallel, 30 ms after the beginning of the start, the output $\overline{Q}$ of the counter C1 changes over to the state 0 and the gate 6 changes over to the state 1, triggering the monostable flip-flop M3, whose output Q changes over to the state 1 during 250 microseconds (diagram Q, FIG. 5). The line being negative at that instant, the gate 5 remains held in the state 1 by the gate 9 which has remained in the state 0. The third bistable flip-flop (19,20) and the gates 10, 11, 12 remain in the state described in paragraph 5 above.

The second and third moments being negative, the testing of the line at the instants 50 and 70 ms (middle of the second and third moments) has, as previously, no effect on the gate 5, which remains closed.

The fourth moment being positive, the connection L changes over to the state 1 and the connection H changes over to the state 0, causing the closing of the gates 9 and 16 (state 1).

From the beginning of the step 27 corresponding to the middle of the fourth moment, the gate 27 opens (state 0) and closes the gate 7 (state 1), which opens the gate 8. The latter, changing over to the state 0, holds the gate 5 in the state 1 during the operating time of the monostable flip-flop M3 (output Q in the state 1 during 250 microseconds).

The fifth moment being negative, the connection L changes over to the state 0 and the connection H changes over to the state 1. The gate 27 closes (state 1) and opens the gate 7 (state 1), which closes the gate 8 (state 1) whereas the gate 9 (state 0), which locks the gate 5, opens.

At the beginning of the step 31, of the counter, the line is positive since 10 milliseconds (first 10 milliseconds of the stop). The connection L changes over to the state 1 and the connection H to the state 0. The gate 8 remains in the state 1 and the gate 9 remains in the state 0. The gate 16 closes, allowing the opening of the gate 31, which changes over to the state 0. The gate 12 assumes the state 1 and opens the gate 10 as a function of the positioning of the flip-flop 19,20 (gate 20 in the state 1). The gate 10 assuming the state 0, unblocks the transistor NTX, which supplies a positive polarity at the output S2 of the device, thus indicating the non-charging of the communication.

The connection J being in the state 0 of the gate 31, the gate CM1 (FIG. 3) closes and blocks the clock, the counter thus remaining at the step 31.

Receiving of a character other than carriage return.

Case of a first positive moment.

The connection L assumes the state 1 and the connection H, the state 0. The gates 8, 9 and 14 are in the state 1. In the middle of the first moment, the monostable flip-flop M3 whose output Q changes over to the state 1 during 250 microseconds, is triggered. The gate 5 opens during that period and reverses the bistable flip-flop 19,20, whose gate 19 assumes the state 1 and whose gate 20 assumes the state 0. Consequently, at the step 31 of the counter, the opening of the gate 31 causes that of the gate 11, which unblocks the transistor TX. The positive polarity supplied at the output S3 of the device, confirms the obligation to charge the communication.

Case of a second and/or third positive moment.

Operation is analogous to that of the preceding case.

Case of a fourth negative moment.

The connection L assumes the state 0 and the connection the state 1. The gate 8 assumes the state 1. The step 27 not yet being reached, the gate 9 is in the state 0 and locks the gate 5.

At the beginning of the step 27, the gate 27 opens, and closes the gate 9 (state 1) whereas the state 1 pulse supplied at the output Q of M3 opens the gate 5 which reverses the flip-flop 19,20 whose output SV passes to the state 1.

At the step 31 of the counter, the gate 11 opens and orders the charging.

Case of a fifth positive moment.

The connection L assumes the state 1 and the connection H, the state 0. The connection H holds the gate 9 in the state 1. The counter being at the step 28, the gate 27 is in the state 1. The gate 7 is in the state 0 and holds the gate 8 in the state 1. In the middle of the fifth moment, the state 1 pulse, supplied at the output Q of M3, opens the gate 5. The following part of the operation is that of the preceding case 6.4.

7. RECEIVING A FALSE START (NEGATIVE PULSE OF LESS THAN 10 MILLISECONDS)

Before the receiving of the false start, the counter is in the waiting position on the step 18. The line being positive, the connection L is in the state 1, the gate 18 (FIG. 3) is in the state 0 and the gate CM1 is in the state 1.

When the false start appears, the line becomes negative. The transistor TE2 assumes the state 0 and forces the gate 18 to assume the state 1. The gate 18 opens the gate CM1 (state 0 ) which starts up the clock. The gate 18 also opens the gate FS, which unblocks the counter C1.

The line becoming positive again before the counter has left the step 18, the transistor TE2 resumes the state 1 and controls the opening of the gate 18, which resumes the state 0. The gate 18 brings the gate FS to the state 1 and the inverter RZ1 to the state 0, the latter locking the counter C1 whose input H1 becomes insensitive to the clock signals. The counter remains held in its waiting position.

8. RELEASING (RESETTING OF THE COUNTER TO THE STEP 0)

This takes place by cancelling of the positive polarity at the input E1 (FIG. 3), it being possible for that polarity to be cancelled, either immediately after the receiving of the first character of the answer-back signal, or after a time-delay in the case where that character is not received. In the first case, after the receiving of the first character, the counter is on the step 31, and in the second case, of non-receiving of this character, the counter is on the step 18.

When the positive polarity at E1 is cancelled, the transistor TE1 assumes the state 1 and the inverter IV1 assumes the state 0. The flip-flop 1,2 resumes its original state (gate 1 in the state 1 and gate 2 in the state 0). The line being positive, the transistor TE2 is in the state 1. The gate 0, whose two inputs are in the state 1 changes over to the state 0 and closes the gates RZ2 and FS, which position the counter again on the step 0.

9. RECEIVING OF SEVERAL 150 MILLISECOND PULSES

In the case of grouped lines, several 150 ms pulses can be received successively before finding an available line. The device then acts as if it had received only one of these pulses, for it returns, after the receiving of each of them, to the step 18.

After the receiving of the first 150 ms pulse, the counter is positioned on the step 18, waiting for the receiving of the first character. If a second 150 ms pulse is received, the line is negative between the instants 0 and 150 ms, that is, from the beginning of the step 18 until 10 ms beyond the end of the step 31 of the counter. During that time, the connection L is in the state 0 and the connection H in the state 1. The gate 16 is therefore in the state 0 and locks the gate 31, which remains closed (state 1) during the step 31 of the counter, thus preventing the closing of the gate CM1 (FIG. 3) by the connection J, and consequently, the stopping of the clock.

At the end of the step 31, the counter, having effected a complete cycle, returns to the step 0. The bistable flip-flop 1,2 having been reversed at the step 13, its output SV is in the state 0. The gate 0 is therefore closed (state 1) and the gate CM1 remaining open, the clock M1, M2 is not stopped. The counter undertakes a second cycle, passes the steps 13 and 17, then stops at the step 18, the gate 18 opening at the said step and closing the gate CM1 which blocks the clock.

The circuits RC connected up to the inputs C and D of the monostable flip-flops M1, M2 and M3 enable the time constants of the said flip-flops to be defined.

It must be understood that the invention is not limited to the embodiment described and illustrated, which has been given only by way of an example. Without going beyond the scope of the invention, details may be modified, certain arrangements may be changed or certain means may be replaced by equivalent means. More particularly, the application of the invention may easily be extended to the case where there is more than one pulse or more than one character to be analyzed, the components of the pulse or of the character possibly having different durations from those given in the example described.

What is claimed is:

1. A logic device for providing an indication of charging or non-charging for telecommunications, said device being operable in connection with a translator element connected between said device and a signal carrying line, said device being operable to provide an indication of charging in response to two predetermined successive signals on said line, said first predetermined signal being a pulse of predetermined duration, and said second predetermined signal being a character of the international code No. 2, said device comprising:

a. peripheral means connected to the input and output terminals of said logic device for converting between input and output signal levels,
b. means for generating time reference signals for discriminating between the reception of said predetermined signals and other signals,
c. means responsive to said time reference signals and to said first predetermined signal for checking the duration of said first predetermined signal, and for subsequently confirming the receipt of said first predetermined signal,
d. means for blocking said time reference generating means for the period between receipt of said first and second predetermined signals,
e. means operative following the confirming of reception of said first predetermined signal for discriminating between signals on said line representing a given character of the international code No. 2 and signals representing another character of said code, said latter means being responsive to said time reference signals and to the signal on said line,
f. enabling means connected to said detecting means for enabling a charging output indication or a non-charging output indication depending upon the receipt or non-receipt of said successive predetermined signals on said line,
g. erasing means for resetting said time reference generator means to an initial time position in response to a signal on said line other than said predetermined signals, and
h. cancelling means for blocking said enabling means in response to a signal on said line having a duration longer than a character of international code No. 2.

2. Device according to claim 1, wherein said logic device has three input terminals and three output terminals and said peripheral means comprises circuits consisting of discrete elements connected respectively to the three inputs and to the three outputs of said device, each of said circuits comprising one transistor per input and per output.

3. A device as claimed in claim 2 wherein said means for generating time reference signals comprises:

a. a clock pulse generator (M1, M2),
b. a counter (C1, C2) connected to said clock pulse generator for counting clock pulses, and
c. a plurality of NAND gates connected to said counter for providing a respective plurality of time reference signals, a first group of said gates (13, 17, 18) being operative to generate their respective time reference signals during the reception of said first predetermined signal, and a second group of said gates (21, 27, 31) being operative to generate their respective time reference signals during the reception of said second predetermined signal.

4. A device as claimed in claim 3 wherein said means for checking and subsequently confirming is adapted to detect the duration of said first predetermined signal within predetermined minimum and maximum limits, said means for checking comprising:

a. a bistable flip-flop (1, 2) having first and second input terminals and adapted to be set to first and second states in response to signals applied to said first and second input terminals, respectively, b. inverter means (IV1) connected to one of said input transistors (TE1) for initially connecting a signal to said first terminal to set said flip-flop to a first state, c. means connecting the time reference signal from a first one (13) of said NAND gates to said second input terminal to reset said flip-flop to said second state, d. means connecting the time reference signal from a second one (17) of said NAND gates to said first input terminal to set said flip-flop back to said first state, and e. gating means (3) responsive to the termination to said first predetermined signal on said line for blocking the generation of a time reference signal by said second NAND gate, whereby the switching of said flip-flop to said second state and the blocking of said second NAND gate (17) from switching said flip-flop back to the first state represent a confirmation that said predetermined first signal was received on said line.

5. A device according to claim 4 wherein said means for checking and subsequently confirming further comprises, gate means (4), responsive to the coincidence of a time reference signal from a third one (18) of said NAND gates and said flip-flop (1, 2) being in said second state, for providing a signal to turn on one of said output transistors (D1), whereby said transistor (D1) provides an output indicating the valid detection of said first predetermined signals.

6. A device affording to claim 5 wherein said means for blocking comprises blocking gate means (CM1) responsive to a time reference signal from said third NAND gate (18) or from a sixth one (31) of said NAND gates for stopping the operation of said clock pulse generator, said blocking gate means comprising a NAND gate having inputs connected to said inverter (IV1), said second, third and sixth NAND gates (17, 18, 31) and an output connected to said clock pulse generator.

7. Device according to claim 3, characterized in that the means for discriminating between the receiving of a given character of the international code No. 2 and the receiving of another character of the said code consist of the connection of the output of the fourth time reference gate (21) with the true input of a second bistable flip-flop (14, 15) whose output is connected up to an input of a gate having four inputs, so that the fourth time reference gate opens at the beginning of the receiving of the first moment of the character and causes the reversing of the second bistable flip-flop, which prepares the opening of the gate having four inputs.

8. Device according to claim 7, wherein the second and third inputs of the gate having four inputs are connected up respectively to an output of a gate (8,9) having two inputs, a first input of each of the said gates being connected with the output of the fifth time reference gate (27), the one directly and the other through a first gate (7) used as an inverter, a second input of each of the said gates being connected with the collector of the second input transistor (TE2), the one directly and the other through the gate (3) for reversing the state of the line, the fourth input of the gate (5) having four inputs being connected up to the output Q of a monostable flip-flop (M3), one of whose inputs A is connected up to the output of the sixth time reference gate (31) through a second gate (12) used as an inverter and whose other input (3) is connected up through another gate (6), used as an inverter, to the complemented output ($\overline{Q}$) of a first counting element (C1) dividing the clock frequency by two so that the monostable flip-flop, being triggered in the middle of each of the moments, the gate (5) having four inputs remains closed when the carriage return character is received, whereas the said gate opens in the case of the receiving of any other character of the code.

9. Device according to claim 7, characterized in that the means enabling either a charging order or a non-charging order according to the character discriminated to be supplied consist in the connection of the gate (5) having four inputs is connected up to the true input of a third bistable flip-flop (19,20) whose true output is connected up to a first input of a gate (11) having two inputs and whose complemented output is connected up to a first input of a gate (10) having two inputs, the second input of the said gates being connected up as a common point to the output of the second reversing gate (12) and their respective outputs being connected up to the base circuit of a charging transistor (TX) and to the base circuit of a non-charging transistor (NTX), so that the gate connected with the charging transistor opens when the counter arrives at the opening step of the sixth time reference gate, whereas the third bistable flip-flop has changed states, the gate connected with the non-charging transistor opens, the unblocked transistor supplying, according to the case, a charging or non-charging order on the third or on the second output of the device.

10. Device according to claim 4, wherein the erasing means consist in the connection of the output of the inverter (IV1), connected with the first input transistor (TE1), as a common point to the first inputs of a pair of positioning gates (RZ2, FS) whose second inputs are connected up as a common point to the output of a gate (0) for checking the first signal and to an input of the gate (CM1) controlling the clock, the checking gate having a first input connected up to the true output of the first bistable flip-flop and a second input connected up to the collector of the second input transistor (TE2), the output of each positioning gate controlling respectively a positioning input (P1 and P2) of each of the two elements (C1 and C2) of the counter, so that the cancelling of the marking on the first input of the device or the return to the positive state of the line before the counter has reached the opening step of the first time reference division gate (13) causes the stopping of the clock and the resetting of the elements of the counter to the step 0.

11. Device according to claim 9, wherein the means for erasing the position assumed by the second and third bistable flip-flops after the receiving of the second signal consist of the connection of the complemented input of each of the said flip-flops as a common point with the output of the third time reference gate (18) so that the opening of the said gate after the receiving of the first control signal controls the positioning of the said flip-flops in a same original state before the receiving of the second signal.

12. Device according to claim 6, further comprising means for starting up the counter again on the correct receiving of the start element of the second signal, the said means possibly enabling the cancelling of the starting up on the receiving of a defective start element (start less than 10 milliseconds), the collector of the second input transistor (TE2) being connected up to the input of the third time reference gate (18), so that the line becoming negative on the receiving of the start, the said gate closes and enables the starting up of the counter, that same gate opening again when the line again becomes positive after a period of less than 10 milliseconds, the said gate blocking the clock before the counter is able to leave its waiting step.

13. Device according to claim 4, wherein the means for cancelling in the case of the receiving of two or several successive first signals, reside in the fact that the sixth time reference gate (31) has an extra input connected up to the output of a locking gate (16) a first input of which is connected up to the output of the said time reference gate and a second input of which is connected up to the output of the gate (3) for reversing the state of the line, so that the repeating of the first signal holding the line in the negative state beyond the opening step (31) of the sixth time reference gate, the locking gate (16) remains open, blocking the sixth gate and enabling the counter to return to its waiting step (18) ready for the receiving of the second signal.

* * * * *